(12) United States Patent
Lee et al.

(10) Patent No.: US 8,707,126 B2
(45) Date of Patent: Apr. 22, 2014

(54) SOURCE-CHANNEL COMBINED CODING METHOD AND SATELLITE BROADCASTING SYSTEM USING THE SAME

(75) Inventors: In Ki Lee, Busan (KR); Dae Ig Chang, Daejeon (KR); Kwang Deok Seo, Gangwon-do (KR); Won Sup Chi, Gangwon-do (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 616 days.

(21) Appl. No.: 12/957,272

(22) Filed: Nov. 30, 2010

(65) Prior Publication Data

US 2011/0131615 A1    Jun. 2, 2011

(30) Foreign Application Priority Data

Dec. 1, 2009 (KR) .................. 10-2009-0117918

(51) Int. Cl.
*H03M 13/00* (2006.01)

(52) U.S. Cl.
USPC ........................... 714/758; 714/752; 714/799

(58) Field of Classification Search
USPC .................. 714/758, 752, 799, 801, 803, 804
See application file for complete search history.

(56) References Cited

U.S. PATENT DOCUMENTS

| | | | | |
|---|---|---|---|---|
| 5,719,898 A | * | 2/1998 | Davidovici et al. | 375/130 |
| 5,963,583 A | * | 10/1999 | Davidovici et al. | 375/130 |
| 6,611,794 B1 | * | 8/2003 | Fleming-Dahl | 702/191 |
| 7,257,371 B1 | | 8/2007 | Bettinger et al. | |
| 8,116,265 B2 | * | 2/2012 | Snapir et al. | 370/328 |
| 2010/0046415 A1 | * | 2/2010 | Kim et al. | 370/315 |

FOREIGN PATENT DOCUMENTS

| | | |
|---|---|---|
| EP | 1487146 A1 | 12/2004 |
| EP | 1901456 A2 | 3/2008 |
| KR | 2004-0073628 A | 8/2004 |
| KR | 2007-0043361 A | 4/2007 |
| KR | 2009-0066337 | 6/2009 |

OTHER PUBLICATIONS

Zhihai He et al. "Joint source channel rate-distortion analysis for adaptive mode selection and rate control in wireless video coding", IEEE Transactions on Circuits and Systems for Video Technology, Vol. 12, No. 6, pp. 511-523, Jun. 2002.

C. Chatellier et al. "A robust joint source channel coding scheme for image transmission over the ionospheric channel", Image Communication 22, pp. 543-556, 2007.

Lisimachos P. Kondi et al., "Joint Source-Channel Coding for Motion-Compensated DCT-Based SNR Scalable Video", IEEE Transactions on Image Processing, Vol. 11, No. 9, pp. 1043-1052, Sep. 2002.

* cited by examiner

*Primary Examiner* — Fritz Alphonse
(74) *Attorney, Agent, or Firm* — Rabin & Berdo, P.C.

(57) ABSTRACT

A source-channel combined coding method including: determining whether a channel signal-to-noise ratio (SNR) is varied or not; when it is determined that the channel SNR is varied, selecting a MODCOD suitable for the channel SNR by referring to a first table defining an SNR threshold value at which data transmission is performed without an error, for each MODCOD designating a low density parity check (LDPC) code rate and a modulation scheme; calculating a source coding rate by using an effective information bit rate of the selected MODCOD; extracting network abstraction layer (NAL) units for each layer from an inputted video frame so as to satisfy the calculated source coding rate, and packetizing the extracted NAL units; binding packets to configure a baseband (BB) frame; and LDPC coding and modulating the BB frame through the code rate and the modulation scheme which are designated by the selected MODCOD.

15 Claims, 5 Drawing Sheets

SOURCE-CHANNEL COMBINED CODING METHOD AND SATELLITE BROADCASTING SYSTEM USING THE SAME

CROSS-REFERENCE TO RELATED APPLICATIONS

This application claims the priority of Korean Patent Application No. 10-2009-0117918 filed on Dec. 1, 2009, in the Korean Intellectual Property Office, the disclosure of which is incorporated herein by reference.

BACKGROUND OF THE INVENTION

1. Field of the Invention

The present invention relates to a source-channel combined coding method, which applies scalable video coding (SVC) video to a digital video broadcasting-satellite 2 (DVB-S2) broadcasting service to reduce rain attenuation while minimizing a structural change of a satellite broadcasting system and, and a satellite broadcasting system using the same.

2. Description of the Related Art

Recently, satellite broadcasting technology has been replaced with a high-performance digital transmission scheme which is able to realize a high sound quality and provides various additional services. Therefore, existing DVB-S systems are being developed into DVB-S2 systems capable of performing high-speed transmissions, interactive data transmissions, and high-quality video transmission.

The service environment of satellite broadcasting is significantly influenced by rainy weather conditions. Therefore, the availability of satellite broadcasting may be reduced during bad weather conditions.

FIG. 1 is a graph showing results obtained by measuring the rain attenuation characteristics of a Ka-band transponder of KOREASAT-3, depending on frequencies. Referring to FIG. 1, it can be seen that an attenuation width increases with a rain concentration rate. In particular, an attenuation characteristic in the 20 GHz band is approximately three times larger than an attenuation characteristic in the Ku band.

In Korea, two thirds of annual precipitation is concentrated on four months of the summer season. Therefore, the quality reduction of satellite broadcasting services caused by rain attenuation is very severe during this time. Recently, research has been reported several times, reporting that the climate of Korea is changing to a subtropical climate. Due to such a change in climate pattern, the average level of annual precipitation is increasing considerably. In reality, the precipitation level between 2003 and 2007 increased by 302.18 mm, compared with precipitation between 1993 and 1997. The rain attenuation value in Seoul alone, during the past five years, has increased by 7.78 dB, as compared with the rain attenuation value between 1990 and 1999.

In order to address such a rain attenuation effect, research has been conducted into a power control method, a fixed compensation method, and an adaptive transmission method. More specifically, research into a variable beam pattern satellite broadcasting system is being conducted by the NHK research laboratory in Japan. The variable beam pattern satellite broadcasting system partially increases transmitted power only in a region in which intense localized rainfall is occurring, using a phased array fed reflector antenna, and compensates for attenuation. DirecTV in the US increases link availability by increasing the equivalent isotropically radiated power (EIRP) of satellites.

Since the above-described transmitted power and beam control methods must be considered when a satellite is designed and manufactured, to be implemented, these methods require a new satellite which satisfies the requirements, and an additional cost for realizing the technology inevitably increases. Therefore, research needs to be conducted into an effective method which is capable of solving the rain attenuation problem while minimizing the structural change of the existing satellite broadcasting system.

Meanwhile, as a video compression technique, there is provided an SVC scheme which is capable of providing an adaptive video service to various environments.

The SVC scheme, which is an extended coding scheme of H.264, has been developed to solve problems such as the fact that scalability based on the SVC scheme attempted by the existing MPEG-2 and MPEG-4 schemes has low compression efficiency, composite scalability cannot be supported, and there are difficulties in implementing the scheme.

The SVC scheme refers to technology which codes several video layers into a single bit stream. The layers may include one base layer (BL) and a plurality of enhancement layers (EL) which may be consecutively stacked on the base layer. Based on lower layer information, each of the enhancement layers may express a bit rate, a frame rate, and resolution, all of which are allocated to the enhancement layer, to the maximum. In the SVC scheme, as the number of enhancement layers to be stacked increases, a variety of bit rates, frame rates, and resolutions may be supported. Therefore, the SVC scheme is suitable for a multimedia contents service under a universal multimedia access (UMA) environment which is capable of handling various problems such as a diversity of bandwidth in a heterogeneous network, a diversity of performance and resolution in receiver terminals, and the various preferences of content consumers.

SUMMARY OF THE INVENTION

An aspect of the present invention provides a source-channel combined coding method, in which LDPC channel coding and SVC source coding are combined to effectively solve a rain attenuation problem without a structural change of a system, and a satellite broadcasting system using the same.

According to an aspect of the present invention, there is provided a source-channel combined coding method including: determining whether a channel signal-to-noise ratio (SNR) is varied or not; when it is determined that the channel SNR is varied, selecting a MODCOD suitable for the channel SNR by referring to a first table defining an SNR threshold value at which data transmission is performed without an error, for each MODCOD designating a low density parity check (LDPC) code rate and a modulation scheme; calculating a source coding rate by using an effective information bit rate of the selected MODCOD; extracting network abstraction layer (NAL) units for each layer from an inputted video frame so as to satisfy the calculated source coding rate, and packetizing the extracted NAL units; binding packets to configure a baseband (BB) frame; and LDPC coding and modulating the BB frame through the code rate and the modulation scheme which are designated by the selected MODCOD.

According to another aspect of the present invention, there is provided a satellite broadcasting system including: a control unit selecting a MODCOD suitable for a channel SNR by referring to a first table defining an SNR threshold value at which data transmission is performed without an error for each MODCOD designating an LDPC code rate and a modulation scheme, and calculating a source coding rate by using an effective information bit rate of the selected MODCOD; a scalable video coding (SVC) extraction and packetized elementary stream (PES) adaptation unit extracting NAL units for each layer from a bit stratum of an inputted video stream so as to satisfy the source coding rate extracted by the control unit, and packetizing the extracted NAL units; a mode adaptation unit configuring the packets generated by the SVC extraction and PES adaptation unit into a BB frame; and a channel coding unit performing LDPC coding and modulation through a code rate and a modulation scheme which are supported by the MODCOD selected by the control unit.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
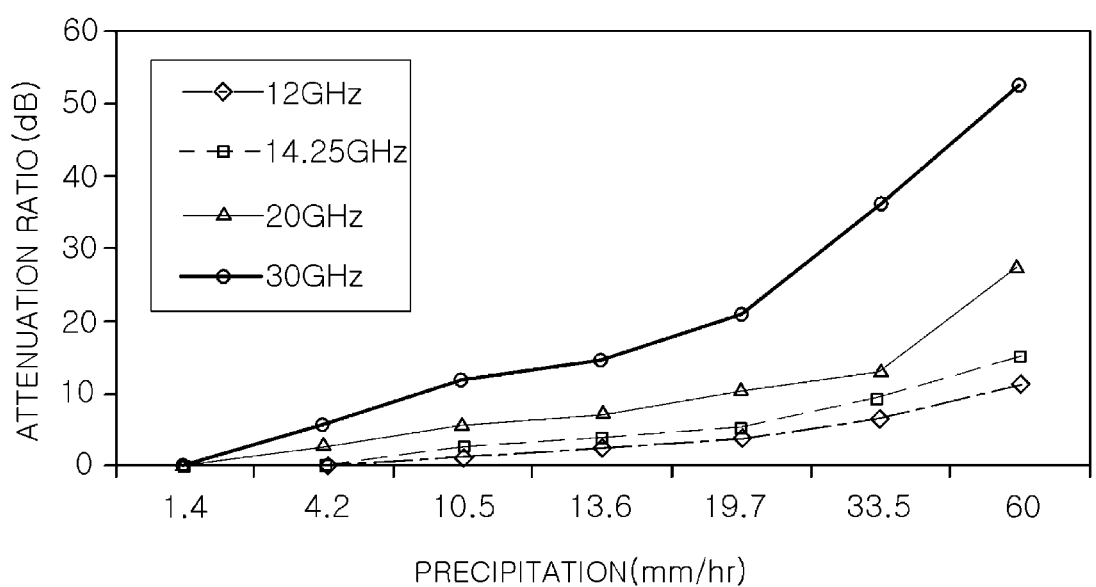
FIG. 1 is a graph showing results obtained by measuring rain attenuation characteristics of a Ka-band transponder of KOREASAT-3, depending on frequencies.

Exemplary embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the thicknesses of layers and regions are exaggerated for clarity. Like reference numerals in the drawings denote like elements, and thus their description will be omitted.

When it is described that one component is 'connected' to another component, the one component may be directly connected to another component. However, it will be understood that yet another component may exist therebetween. On the other hand, when it is described that one component is 'directly connected' to another component, it will be understood that yet another component does not exist therebetween. Furthermore, when it is described that one component 'includes' another component, it means that the one component does not exclude yet another component, but may include yet another component.

First, the basic principle of a source-channel combined coding method according to an embodiment of the present invention will be described.

The DVB-S2 standard uses a low density parity check (LDPC) code as technology for forward error correction (FEC). The LDPC may support 11 kinds of code rates. The code rates may be properly combined with four kinds of modulation schemes supported by the DVB-S2 system to support 28 kinds of MODCODs. The modulation schemes include a quadrature phase-shift keying (QPSK) modulation scheme, an 8-PSK modulation scheme, a 16-amplitude and phase-shift keying (APSK) modulation scheme, and a 32-APSK modulation scheme. Table 1 shows a combination of modulation scheme and LCPC code rate for each of 28 MODCODs which may be supported by the DVB-S2 system.

TABLE 1

| Mode | MODCOD |
|---|---|
| QPSK 1/4 | $1_D$ |
| QPSK 1/3 | $2_D$ |
| QPSK 2/5 | $3_D$ |
| QPSK 1/2 | $4_D$ |
| QPSK 3/5 | $5_D$ |
| QPSK 2/3 | $6_D$ |
| QPSK 3/4 | $7_D$ |
| QPSK 4/5 | $8_D$ |
| QPSK 5/6 | $9_D$ |
| QPSK 8/9 | $10_D$ |
| QPSK 9/10 | $11_D$ |
| 8PSK 3/5 | $12_D$ |
| 8PSK 2/3 | $13_D$ |
| 8PSK 3/4 | $14_D$ |
| 8PSK 5/6 | $15_D$ |
| 8PSK 8/9 | $16_D$ |
| 8PSK 9/10 | $17_D$ |
| 16APSK 2/3 | $18_D$ |
| 16APSK 3/4 | $19_D$ |
| 16APSK 4/5 | $20_D$ |
| 16APSK 5/6 | $21_D$ |
| 16APSK 8/9 | $22_D$ |
| 16APSK 9/10 | $23_D$ |
| 32APSK 3/4 | $24_D$ |
| 32APSK 4/5 | $25_D$ |
| 32APSK 5/6 | $26_D$ |
| 32APSK 8/9 | $27_D$ |
| 32APSK 9/10 | $28_D$ |
| Reserved | $29_D$ |
| Reserved | $30_D$ |
| Reserved | $31_D$ |
| DUMMY PLFAME | $0_D$ |

Figure 2:
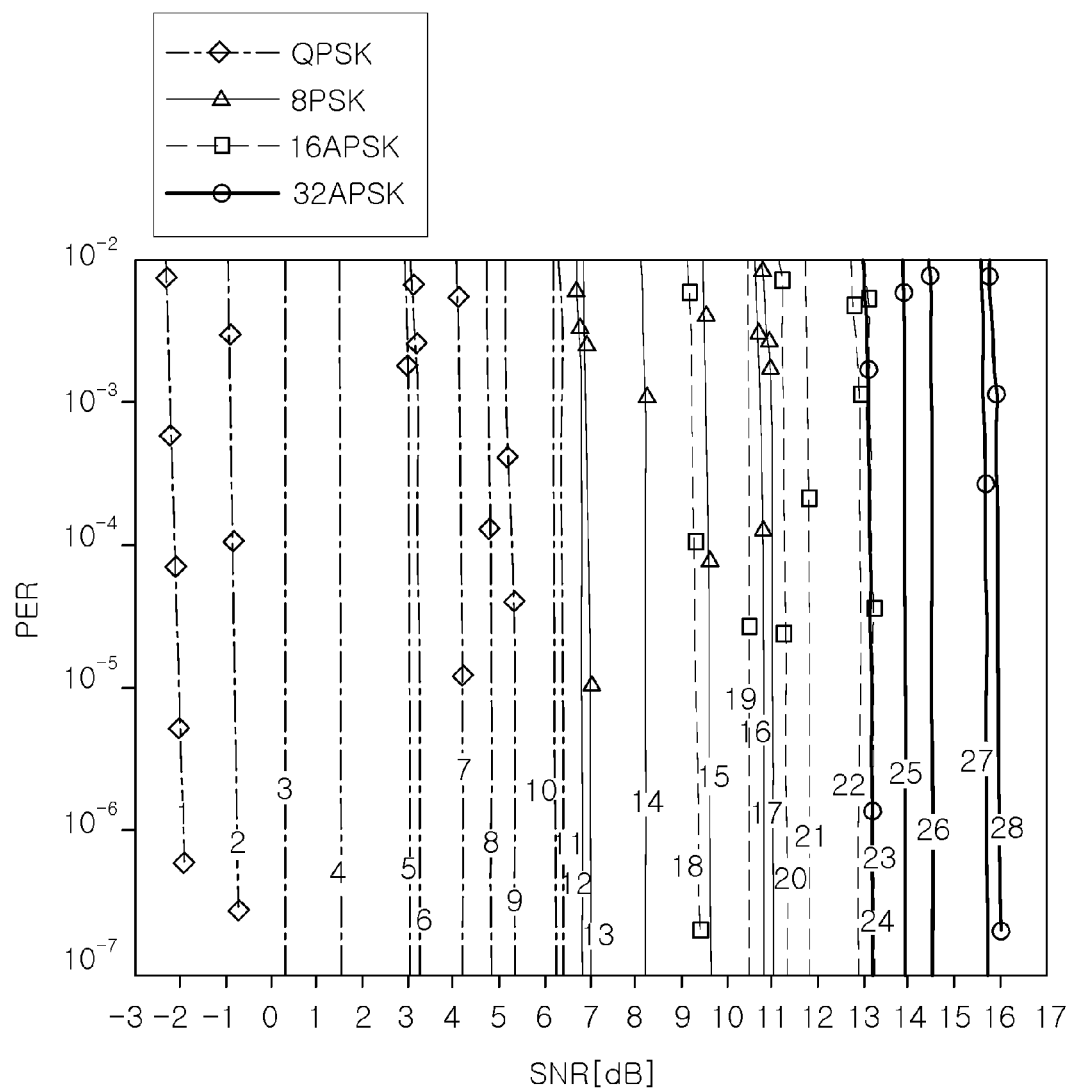
FIG. 2 is a graph showing a packet error rate (PER) curve for each MODCOD in a DVB-S2 system.

The present applicant has tested packet error rate (PER) performance depending on signal to noise ratio (SNR) variations of additive white Gaussian noise (AWGN) channels, when the LDPC coding and the modulation are performed by applying 28 kinds of MODCODs. FIG. 2 shows the results. For reference, the 28 different kinds of MODCODs in FIG. 2 are represented by numbers 1 through 28.

The PER means an error rate for transport stream (TS) packets. In the above-described test, a normal FEC frame (N=64,800) was used, and the maximum repetition number of an LCPC decoder was set to 40.

Referring to FIG. 2, it can be seen that the SNR ranges from approximately −2 dB to 16 dB, depending on 28 kinds of MODCODs. Accordingly, stable data transmission and effective bandwidth use may be performed by selecting a proper MODCOD in various channel environments.

Based on the above-described results, an LDPC code rate and a modulation scheme which are to be used to LDPC encoding and mapping in the DVB-S2 system, respectively, may be adaptively selected. Furthermore, the SVC source coding scheme may be combined with the LDPC code rate and the modulation scheme, in order to prevent the availability reduction caused by weather conditions.

In the following descriptions, a data rate allocated to the source coding is referred to as a source coding rate ($R_{sc}$[bps]), a data rate allocated to the channel coding is referred to as a channel coding rate ($R_{ch}$[bps]), and the total available data rate of a channel is a channel rate ($R_{total}$[bps]).

The source-channel combined coding method according to the embodiment of the present invention decides an optimal source coding rate $R_{sc}$, such that the sum of the source coding rate $R_{sc}$ and the channel coding rate $R_{ch}$ is equalized to the channel rate $R_{total}$, as expressed in Equation 1 below.

$$R_{total}=R_{sc}+R_{ch} \qquad \text{[Equation 1]}$$

In the DVB-S2 system, the channel rate $R_{total}$ is not fixed, but depends on a channel bandwidth BW [Hz], a roll-off factor α of the quadrature modulation, a symbol rate $R_s$ [symbols/sec], and a bit rate $R_m$ [bits/symbol] based on each modulation scheme. Among them, the channel bandwidth BW, the roll-off factor α, and the symbol rate $R_s$ have a relationship expressed as Equation 2 below.

$$BW=R_s(1+\alpha) \qquad \text{[Equation 2]}$$

Referring to Equation 2, it can be seen that when the channel bandwidth BW is constant, the symbol rate $R_s$, indicating a channel capacity, is decided by the roll-off factor α. Therefore, the channel rate $R_{total}$ depends only on the modulation scheme in the DVB-S2 system, and may be expressed as Equation 3 below.

$$R_{total}=R_s \times R_m \qquad \text{[Equation 3]}$$

In Equation 3, $R_m$ represents a bit rate [bits/symbol]. Considering constellation for each modulation scheme, the bit rates $R_m$ of the QPSK, 8PSK, 16APSK, and 32APSK modulation schemes are 2, 3, 4, and 5, respectively. Therefore, the 32APSK modulation scheme has a channel rate two times larger than that of the QPSK modulation scheme.

Each of the MODCODs in the DVB-S2 system designates an LDPC code rate $R_c$ [k/n] as well as the modulation scheme. Considering the LCPC code rate $R_c$ supported for each MODCOD, an effective information bit rate $R_e$ [bits/symbol] may be expressed as Equation 4 below.

$$R_e=R_m \times R_c \qquad \text{[Equation 4]}$$

Therefore, the source coding rate $R_{sc}$ for the constant symbol rate $R_s$ in the DVB-S2 system may be calculated as Equation 5 below.

$$R_{sc}=R_{total} \times R_c=R_s \times R_m \times R_c=R_s \times R_e \qquad \text{[Equation 5]}$$

Figure 3:
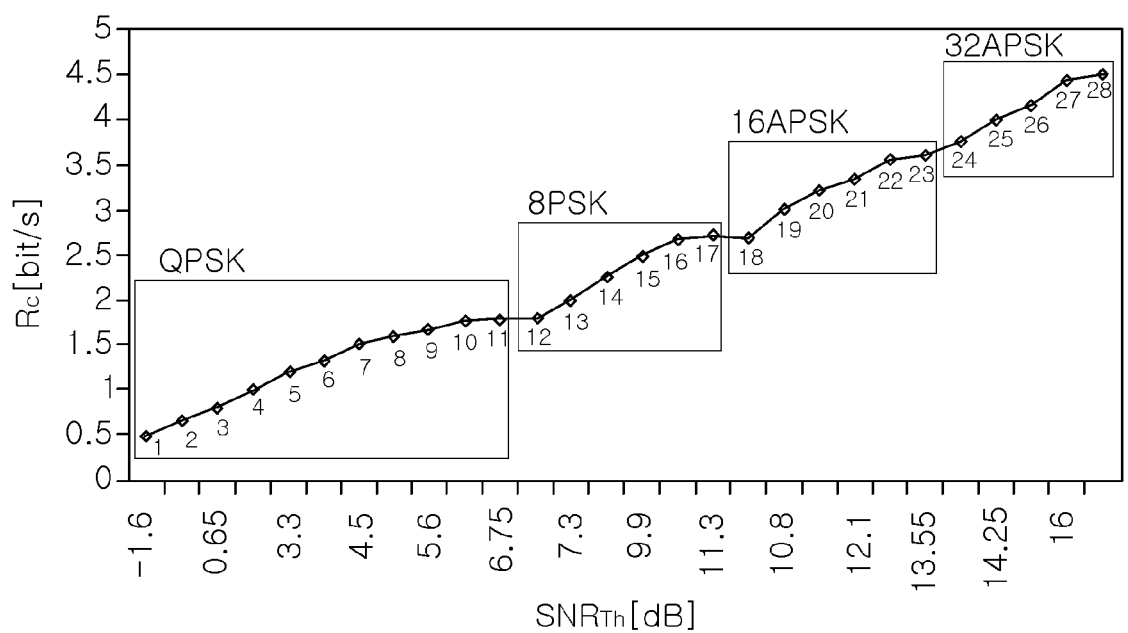
FIG. 3 is a graph showing the relationship between an effective information bit rate and a SNR threshold value for MODCOD.

Referring to FIG. 3, it can be seen that the source coding rate $R_{sc}$ and the effective information bit rate $R_e$ are proportional to each other.

Subsequently, an SNR threshold value $SNR_{Th}$ of a channel for each MODCOD, at which source data may be transmitted by the LDPC channel coding without an error, that is, in a state in which the PER is zero, may be calculated from the measurement result of the PER for each MODCOD in the DVB-S2 system as shown in FIG. 2. In the result of FIG. 2, when an additional guard band (for example, 0.3 dB) is set to guarantee a stable operation for each MODCOD, the SNR threshold value $SNR_{Th}$ of the channel for each MODCOD may be represented as shown in Table 2 below. Therefore, it is possible to decide a MODCOD for transmitting source data without an error, depending on the SNR of the channel.

TABLE 2

| MODCOD | $SNR_{Th}$[dB] |
| --- | --- |
| 1 | −1.6 |
| 2 | −0.4 |
| 3 | 0.65 |
| 4 | 1.85 |
| 5 | 3.3 |
| 6 | 3.6 |
| 7 | 4.5 |
| 8 | 5.1 |
| 9 | 5.6 |

TABLE 2-continued

| MODCOD | $SNR_{Th}$[dB] |
| --- | --- |
| 10 | 6.55 |
| 11 | 6.75 |
| 12 | 7.15 |
| 13 | 7.3 |
| 14 | 8.55 |
| 15 | 9.9 |
| 16 | 11.1 |
| 17 | 11.3 |
| 18 | 9.7 |
| 19 | 10.8 |
| 20 | 11.6 |
| 21 | 12.1 |
| 22 | 13.2 |
| 23 | 13.55 |
| 24 | 13.5 |
| 25 | 14.25 |
| 26 | 15.0 |
| 27 | 16.0 |
| 28 | 16.3 |

In summary, the source-channel combined coding method according to the embodiment of the present invention adaptively selects a modulation scheme and a source coding rate by comprehensively considering the SNR threshold value of a AWGN channel for each MODCOD which may be tolerated without an error and an effective information bit rate $R_e$ based on an LDPC code rate and a modulation scheme which are supported for each MODCOD. Therefore, it is possible to stably provide a high-quality service regardless of weather conditions. That is, when the SNR of a channel dynamically varies, a proper MODCOD is set in accordance with the SNR of the channel, and a source coding rate to be allocated to the channel and a channel coding rate to be allocated to a source are adaptively changed. At this time, the LDPC coding rate and the modulation scheme which are supported for each MODCOD follow the DVB-S2 standard, and the effective information bit rate $R_e$ differs depending on the MODCOD. The effective information bit rate $R_e$ is varied depending on the SNR variation of the channel. FIG. 3 shows a relationship between the effective information bit rate $R_e$ and the SNR threshold value of the channel.

Referring to FIG. 3, it can be seen that the relationship between the effective information bit rate $R_e$ and the SNR threshold value of the channel is almost linear. The source-channel combined coding method according to the embodiment of the present invention uses such a characteristic. That is, when the SNR of the channel increases, the effective information bit rate $R_e$ is increased by increasing the MODCOD. On the other hand, when the SNR of the channel decreases, the effective information bit rate $R_e$ may be reduced to provide a guarantee against an error.

Accordingly, the source-channel combined coding method according to the embodiment of the present invention may provide a stable and reliable transmission service by allocating a larger bandwidth to the channel coding when rain attenuation is severe. Furthermore, when a channel environment is favorable, the source-channel combined coding method according to the embodiment of the present invention may provide high-quality video by allocating a larger bandwidth to the source coding.

Figure 4:
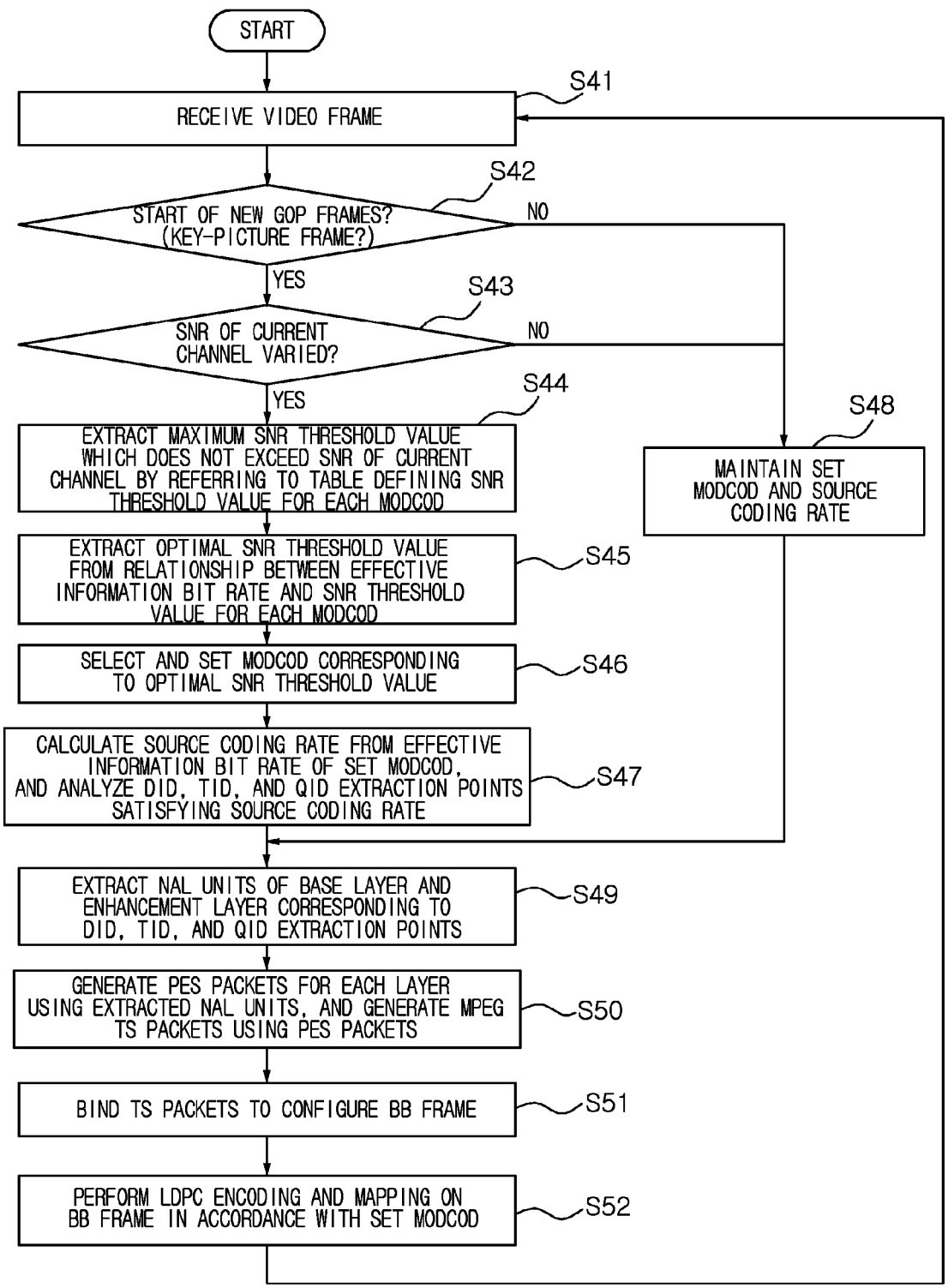
FIG. 4 is a flow chart sequentially showing a source-channel combined coding method according to an embodiment of the present invention.

FIG. 4 is a flow chart sequentially showing the source-channel combined coding method according to the embodiment of the present invention, based on the above-described principle.

Referring to FIG. 4, the source-channel combined coding method according to the embodiment of the present invention will be described as follows.

Video frames which are to be transmitted to the DVB-S2 system are sequentially inputted in order for satellite broadcasting. When a video frame is inputted in such a manner (S41), it is first determined whether the inputted video frame is the start of a new group of picture frames (GOP). That is, it is determined whether the inputted video frame is a key-picture frame or not (S42).

Then, it is determined whether the SNR of a satellite broadcasting channel was varied or not (S43). The SNR of the channel may be determined through information which is estimated by a receiver of a satellite broadcasting system and transmitted to a transmitter through a return channel.

When it is determined that the inputted video frame is not a key-picture frame or the SNR of the channel was not varied, a MODCOD and a source coding rate which are currently set are not changed but are maintained as they are (S48).

On the other hand, when it is determined that the inputted video frame is a key-picture frame or that the SNR of the channel was varied, operations S44 to S47 are performed to decide a MODCOD and a source coding rate which are suitable for the varied SNR.

That is, referring to Table 2 defining an SNR threshold value for each MODCOD at which data may be transmitted without an error, a maximum SNR threshold value $SNR_{Th}^{max}$ which does not exceed the SNR of the current channel is extracted (S44). Then, an SNR threshold value corresponding to the largest effective information bit rate $R_e$, among the SNR threshold values $SNR_{Th}$ which do not exceed the maximum SNR threshold value $SNR_{Th}^{max}$, is extracted as an optimal SNR threshold value $SNR_{Th}^{opt}$ from the relationship between the effective information bit rate and the SNR threshold value of the channel (refer to FIG. 3) (S45). Then, a MODCOD corresponding to the optimal SNR threshold value $SNR_{Th}^{opt}$ is selected by referring to Table 2. Subsequently, the effective information bit rate $R_e$ based on the selected MODCOD is applied to Equation 5 to calculate and set a source coding rate $R_{sc}$, and extraction points of a dependency ID (DID), a temporal ID (TID), and a quality ID (QID) for extracting an SVC bit stream, which satisfy the set source coding rate $R_{sc}$, are analyzed and designated (S47). Through the operations S44 to S47, the MODCOD (the modulation code and the channel coding rate) and the source coding rate which are suitable for the SNR of the current channel are set.

As described above, when the MODCOD and the source coding rate are set, the source coding and the channel coding are performed in accordance with the MODCOD and the source coding rate which are set through operations S49 to S52.

More specifically, a base layer and an enhancement layer corresponding to the designated DID, TID, and QID extraction points are discriminated to extract network abstraction layer (NAL) units from an SVC bit stream (S49).

Subsequently, the extracted NAL units of the base layer and the enhancement layer are used to generate packetized elementary stream (PES) packets, and the PES packets are used to generate MPEG TS packets (S50).

Then, the MPEG TS packets are bound to configure a baseband (BB) frame with a constant size (S51).

Subsequently, the LCPC encoding is performed on the BB frame in accordance with the coding rate designated by the set MODCOD, and the channel coding is then performed by modulating the encoded BB frame through the modulation scheme designated by the set MODCOD (S52).

The above-described operations S41 and S52 are repetitively performed for each video frame.

Figure 5:
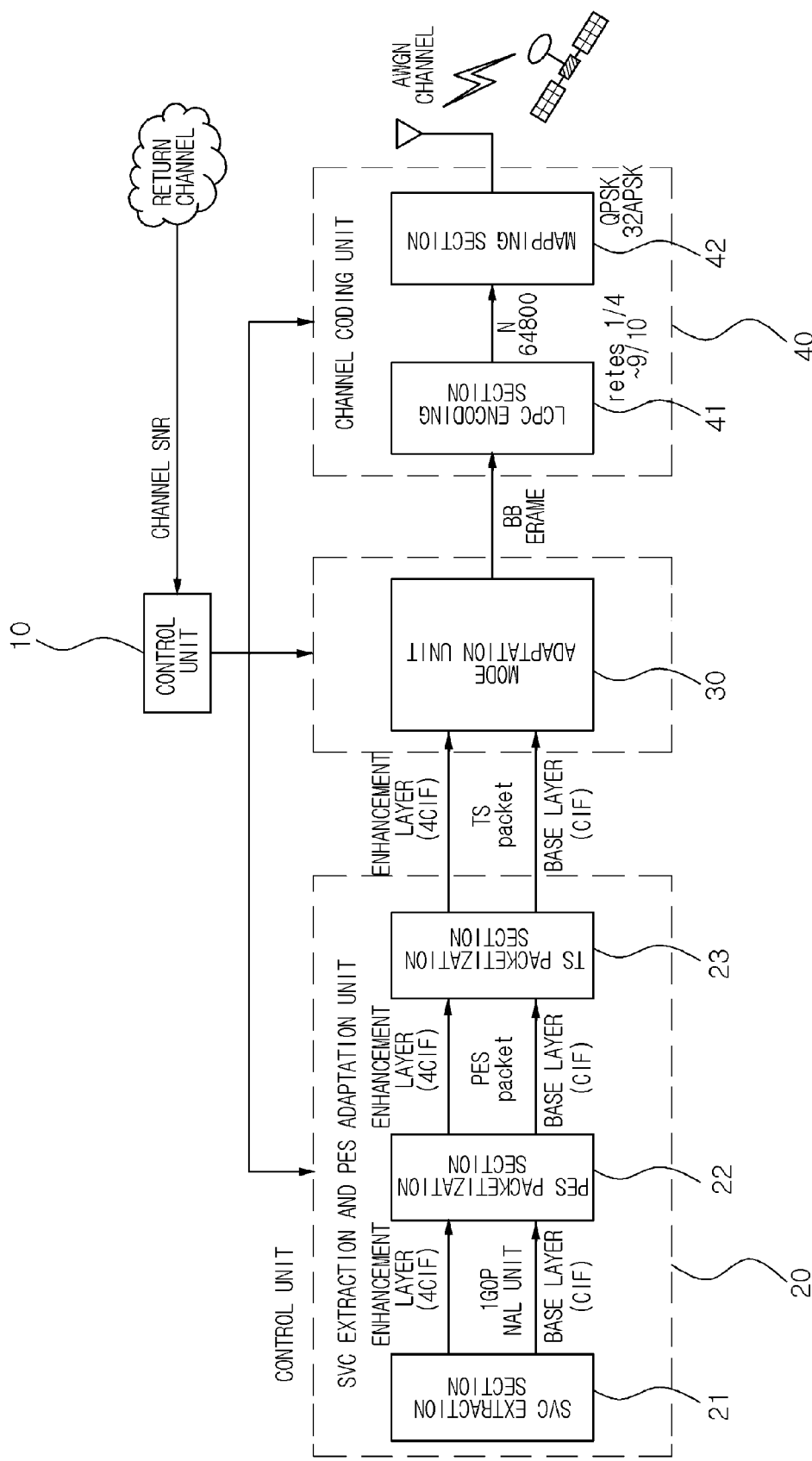
FIG. 5 is a diagram illustrating the structure of a satellite broadcasting system according to another embodiment of the present invention.

FIG. 5 is a diagram illustrating the structure of a satellite broadcasting system according to another embodiment of the present invention. FIG. 5 illustrates only the configuration of a transmitter related to the source-channel combined coding method according to the embodiment of the present invention.

Referring to FIG. 5, the satellite broadcasting system according to the embodiment of the present invention includes a control unit 10, an SVC extraction and PES adaptation unit 20, a mode adaptation unit 30, and a channel coding unit 40.

The SVC extraction and PES adaptation unit 20 includes an SVC extraction section 21, a PES packetization section 22, and a TS packetization section 23. The channel coding unit 40 includes an LDPC encoding section 41 and a mapping section 42.

The control unit 10 acquires an SNR of a current channel from a receiver of a satellite broadcasting signal through a return channel, and compares the SNR with a previously acquired SNR of the channel to decide whether the SNR was varied or not. When it is determined that the SNR was varied, the control unit 10 decides a MODCOD and a source coding rate which are suitable for the SNR of the current channel. The decision of the MODCOD and the source coding rate will be described more specifically as follows. Among SNR threshold values for the respective MODCODs which do not exceed the SNR of the current channel, a maximum SNR threshold value is extracted. Then, among the SNR threshold values which do not exceed the maximum SNR threshold value, an SNR threshold value corresponding to the largest effective information bit rate $R_c$ is extracted as an optimal SNR threshold value, and a MODCOD having the optimal SNR threshold value is selected. Then, the effective information bit rate $R_e$ of the MODCOD is used to calculate a source coding rate $R_{sc}$ through Equation 5. The control unit 10 analyzes DID, TID, and QID extraction points for extracting an SVC bit stream, which satisfy the calculated source coding rate $R_{sc}$.

In accordance with the control of the control unit 10, the SVC extraction and PES adaptation unit 20 extracts a NAL unit for each layer of the SVC bit stream so as to satisfy the source coding rate, and packetizes the extracted NAL unit. More specifically, the SVC extraction section 21 extracts the NAL units of the base layer and the enhancement layer corresponding to the DID, TID, and QID extraction points decided by the control unit 10, from the inputted video frame, that is, the SVC compressed bit stream. The base layer supports common intermediate format (CIF) or standard definition (SD) resolution to provide a low-resolution broadcasting service. The enhancement layer supports 4CIF or high definition (HD) resolution to provide a high-resolution broadcasting service. The NAL units divided into the base layer and the enhancement layer are packetized into PES packets by the PES packetization section 22, and the PES packets are packetized into MPEG-2 TS packets by the TS packetization section 23.

The mode adaptation unit 30 receives the TS packets and binds the TS packets to generate a BB frame with a constant size.

The channel coding unit 40 performs LDPC coding and modulation on the BB frame. Specifically, the LCPC encoding section 41 LDPC-encodes the BB frame at the coding rate based on the MODCOD decided by the control unit 10, and the mapping section 42 modulates the encoded BB frame through the modulation scheme based on the MODCOD and transmits the modulated BB frame to the receiver through an AGWN channel.

Although the channel environment is dynamically changed depending on rainy weather conditions, the source coding and the channel coding are performed in accordance with the changed channel environment. More specifically, when the SNR of the channel increases, the effective information bit rate $R_e$ is increased by increasing the MODCOD. Then, the source coding rate increases. On the other hand, when the SNR of the channel decreases, the effective information bit rate $R_e$ is decreased to decrease the source coding rate. Then, it is possible to provide a characteristic against an error. Therefore, the source data may be perfectly reproduced in the receiver without being affected by an error.

According to the embodiments of the present invention, an optimal MODCOD is decided for a channel SNR which is dynamically varied, and a source coding rate and a channel coding rate are adjusted in accordance with a coding rate and a modulation scheme which are designated by the MODCOD. Therefore, source data in a channel environment which is dynamically varied by Gaussian noise may be perfectly reproduced by a receiver without being affected by an error, and a minimum channel coding rate which may be tolerated for a channel error may be allocated to increase the source coding rate. Therefore, it is possible to provide a high-quality video service. Accordingly, it is possible to effectively solve a rain attenuation problem.

Furthermore, a new satellite does not need to be manufactured and the structure of the system does not need to be changed excessively in order to solve a rain attenuation problem. The process of selecting a MODCOD suitable for a channel state and the PES packetization process may be simply added to solve a rain attenuation problem.

While the present invention has been shown and described in connection with the exemplary embodiments, it will be apparent to those skilled in the art that modifications and variations can be made without departing from the spirit and scope of the invention as defined by the appended claims.

What is claimed is:

1. A source-channel combined coding method comprising:
    determining, by a satellite broadcasting system, whether a channel signal-to-noise ratio (SNR) is varied or not;
    when it is determined that the channel SNR is varied, selecting a MODCOD suitable for the channel SNR by referring to a first table defining an SNR threshold value at which data transmission is performed without an error, for each MODCOD designating a low density parity check (LDPC) code rate and a modulation scheme;
    calculating a source coding rate by using an effective information bit rate of the selected MODCOD;
    extracting network abstraction layer (NAL) units for each layer from an inputted video frame so as to satisfy the calculated source coding rate, and packetizing the extracted NAL units;
    binding packets to configure a baseband (BB) frame; and
    LDPC coding and modulating the BB frame through the code rate and the modulation scheme which are designated by the selected MODCOD.

2. The source-channel combined coding method of claim 1, further comprising determining whether the video frame is the start of a new group of picture frames or not, when the video frame is inputted,
    wherein when it is determined that the video frame is the start of a new group of picture frames, the determining of whether the channel SNR is varied or not is performed.

3. The source-channel combined coding method of claim 1, wherein the selecting of the MODCOD comprises:
    extracting a maximum SNR threshold value which does not exceed the channel SNR, from the first table;
    extracting an SNR threshold value, which does not exceed the maximum SNR threshold value and corresponds to the largest effective information bit rate, as an optimal SNR threshold value from the relationship between the SNR threshold value and the effective information bit rate; and
    extracting a MODCOD corresponding to the optimal SNR threshold value from the first table.

4. The source-channel combined coding method of claim 1, wherein, in the calculating of the source coding rate, the source coding rate is calculated by an equation of $Rsc = Rs \times Re$, where Rsc represents the source coding rate, Rs represents a symbol rate, and Re represents the effective information bit rate.

5. The source-channel combined coding method of claim 1, further comprising analyzing extraction points satisfying the calculated source coding rate, before the extracting of the NAL units,
    wherein the NAL units are extracted from the extraction points.

6. The source-channel combined coding method of claim 1, wherein the SNR threshold value for each MODCOD in the first table is set by adding a guard band for guaranteeing a stable operation to a minimum SNR for each MODCOD at which data transmission is performed without an error.

7. The source-channel combined coding method of claim 1, wherein the channel SNR is acquired from information transmitted from a receiver through a return channel.

8. A satellite broadcasting system comprising:
    a control unit selecting a MODCOD suitable for a channel signal-to-noise ratio (SNR) by referring to a first table defining an SNR threshold value at which data transmission is performed without an error for each MODCOD designating a low density parity check (LDPC) code rate and a modulation scheme, and calculating a source coding rate by using an effective information bit rate of the selected MODCOD;
    a scalable video coding (SVC) extraction and packetized elementary stream (PES) adaptation unit extracting network abstraction layer (NAL) units for each layer from a bit stratum of an inputted video stream so as to satisfy the source coding rate extracted by the control unit, and packetizing the extracted NAL units;
    a mode adaptation unit configuring the packets generated by the SVC extraction and PES adaptation unit into a baseband (BB) frame; and
    a channel coding unit performing LDPC coding and modulation through a code rate and a modulation scheme which are supported by the MODCOD selected by the control unit.

9. The satellite broadcasting system of claim 8, wherein the control unit extracts a maximum SNR threshold value which does not exceed the channel SNR from the first table, extracts an SNR threshold, which does not exceed the maximum SNR threshold value and corresponds to the largest effective information bit rate, as an optimal SNR threshold value from the relationship between the SNR threshold value and the effective information bit rate, extracts a MODCOD corresponding to the optimal SNR threshold value from the first table, and sets a MODCOD suitable for the channel SNR.

10. The satellite broadcasting system of claim 8, wherein the control unit calculates the source coding rate through an equation of $Rsc = Rs \times Re$, where Rsc represents the source coding rate, Rs represents a symbol rate, and Re represents the effective information bit rate.

11. The satellite broadcasting system of claim 8, wherein the control unit analyzes extraction points satisfying the calculated source coding rate, and provides the extraction points to the SVC extraction and PES adaptation unit.

12. The satellite broadcasting system of claim 8, wherein the SNR threshold value for each MODCOD in the first table is set by adding a guard band for guaranteeing a stable operation to a minimum SNR for each MODCOD at which data transmission is performed without an error.

13. The satellite broadcasting system of claim 8, wherein the control unit acquires the channel SNR from information transmitted from a receiver through a return channel.

14. The satellite broadcasting system of claim 8, wherein the SVC extraction and PED adaptation unit comprises:
   an SVC extraction section extracting a NAL unit for each layer from a bit stream of an inputted video frame in accordance with control of the control unit;
   a PES packetization section generating a PES packet for each layer from the NAL unit extracted by the SVC extraction section; and
   a TS packetization unit generating an MPEG TS packet for each layer from the PES packet outputted from the PES packetization section.

15. The satellite broadcasting system of claim 8, wherein the channel coding unit comprises:
   an LDPC encoding section LDPC-encoding the BB frame at a code rate based on the control of the control unit; and
   a mapping section modulating the data outputted from the LCPC encoding section through a modulation scheme based the control of the control unit.

* * * * *